United States Patent
Terauchi et al.

(10) Patent No.: US 10,132,374 B2
(45) Date of Patent: Nov. 20, 2018

(54) FRICTION ENGAGEMENT ELEMENT, DRY CLUTCH, AND METHOD OF MANUFACTURING FRICTION ENGAGEMENT ELEMENT

(71) Applicants: NISSAN MOTOR CO., LTD., Kanagawa (JP); EXEDY Corporation, Osaka (JP); EXEDY Friction Material Co., LTD, Amphur Muang (TH)

(72) Inventors: Seiji Terauchi, Kanagawa (JP); Kazushige Yoshida, Kanagawa (JP); Tatsuya Osone, Kanagawa (JP); Takahiro Saruwatari, Kanagawa (JP); Nobuyasu Watanabe, Osaka (JP); Takeshi Yamada, Osaka (JP); Hiroki Mori, Osaka (JP); Takashi Takehara, Amphur Muang (TH); Shinya Unigame, Amphur Muang (TH)

(73) Assignees: NISSAN MOTOR CO., LTD., Kanagawa (JP); EXEDY Corporation, Osaka (JP); EXEDY Friction Material Co., LTD, Amphur Muang (TH)

( * ) Notice: Subject to any disclaimer, the term of this patent is extended or adjusted under 35 U.S.C. 154(b) by 13 days.

(21) Appl. No.: 15/022,445

(22) PCT Filed: Sep. 18, 2013

(86) PCT No.: PCT/JP2013/075196
§ 371 (c)(1),
(2) Date: Mar. 16, 2016

(87) PCT Pub. No.: WO2015/040706
PCT Pub. Date: Mar. 26, 2015

(65) Prior Publication Data
US 2016/0281810 A1 Sep. 29, 2016

(51) Int. Cl.
*F16D 69/02* (2006.01)
*B32B 3/30* (2006.01)
(Continued)

(52) U.S. Cl.
CPC ............... *F16D 69/02* (2013.01); *B32B 3/30* (2013.01); *B32B 27/06* (2013.01); *F16D 13/64* (2013.01);
(Continued)

(58) Field of Classification Search
CPC ..... B32B 27/06; B32B 3/30; B32B 2307/538; B32B 2605/00; F16D 13/64;
(Continued)

(56) References Cited

U.S. PATENT DOCUMENTS 3,261,440 A * 7/1966 Graham ................ F16D 25/123
188/251 R
3,552,533 A * 1/1971 Nitz ...................... D01F 11/125
188/251 A
(Continued)

FOREIGN PATENT DOCUMENTS

JP S62-137436 A 6/1987
JP S62-142630 A 6/1987
(Continued)

OTHER PUBLICATIONS

International Preliminary Report on Patentability issued in corresponding International Application No. PCT/JP2013/075196, dated Mar. 31, 2016 (11 pages).

*Primary Examiner* — David J Hlavka
(74) *Attorney, Agent, or Firm* — Osha Liang LLP (57) ABSTRACT

A friction engagement element has a friction member including resin, and a metal member having a sliding surface slidable on the friction member. The friction member has an aged layer at an outermost layer of the friction member, and
(Continued)

a hardened layer in abutment with an inner side of the aged layer in a thickness direction of the friction member. The sliding surface of the metal member has a plurality of recesses, and a transferred film of the aged layer of the friction member transferred and adhered to insides of the plurality of recesses through sliding between the friction member and the metal member.

17 Claims, 7 Drawing Sheets

(51) Int. Cl.
*F16D 69/00* (2006.01)
*F16D 13/64* (2006.01)
*B32B 27/06* (2006.01)
*F16D 25/0638* (2006.01)
*F16D 69/04* (2006.01)

(52) U.S. Cl.
CPC ........... *F16D 13/648* (2013.01); *F16D 69/00* (2013.01); *F16D 69/026* (2013.01); *B32B 2307/538* (2013.01); *B32B 2605/00* (2013.01); *F16D 25/0638* (2013.01); *F16D 2069/004* (2013.01); *F16D 2069/0441* (2013.01); *F16D 2069/0466* (2013.01); *F16D 2200/0082* (2013.01); *F16D 2200/0086* (2013.01); *F16D 2250/0038* (2013.01); *F16D 2300/08* (2013.01); *F16D 2300/10* (2013.01)

(58) Field of Classification Search
CPC ........ F16D 13/648; F16D 69/00; F16D 69/02; F16D 69/026; F16D 2069/004; F16D 2069/0441; F16D 2069/0466; F16D 2200/0082; F16D 2200/0086; F16D 2250/0038

See application file for complete search history.

(56) References Cited

U.S. PATENT DOCUMENTS

| | | | | |
|---|---|---|---|---|
| 4,667,534 | A | * | 5/1987 | Kataoka ................. F16H 48/22 192/107 R |
| 5,482,742 | A | * | 1/1996 | Takamiya ........... F16D 65/0006 188/251 A |
| 6,585,089 | B1 | * | 7/2003 | Parker ................... F16D 65/092 188/218 XL |
| 2002/0045393 | A1 | | 4/2002 | Umezawa et al. |
| 2005/0074595 | A1 | * | 4/2005 | Lam ...................... F16D 69/026 428/297.4 |
| 2010/0018831 | A1 | * | 1/2010 | Szpak ................. F16D 25/0635 192/18 A |

FOREIGN PATENT DOCUMENTS

| | | |
|---|---|---|
| JP | S62-149629 U | 9/1987 |
| JP | S63-317532 A | 12/1988 |
| WO | 1996-037538 A1 | 11/1996 |

\* cited by examiner

FRICTION ENGAGEMENT ELEMENT, DRY CLUTCH, AND METHOD OF MANUFACTURING FRICTION ENGAGEMENT ELEMENT

BACKGROUND

Technical Field

The present invention relates to a friction engagement element, a dry clutch including a friction engagement element, and a method of manufacturing a friction engagement element.

Related Art

Devices configured to transmit motive force (torque) by means of engagement of a friction engagement element have been widely utilized in various fields including transportation machines such as automobiles and industrial machines. Examples of such devices utilized in the automotive field include driving-mode transition clutches for use in driving-force transmission devices of hybrid electric vehicles, start clutches of vehicles using only one of an engine or an electric motor as a drive source for travel, braking devices of vehicles, and the like. Patent Literature 1 discloses a friction member for use as a brake pad of an automobile.

CITATION LIST

Patent Literature

Patent Literature 1: Japanese Patent Application Publication No. S62-142630

SUMMARY

Meanwhile, these devices configured to transmit motive force by means of engagement of a friction engagement element sometimes encounter a phenomenon in which the transmission of the motive force becomes unstable and the transmitted torque greatly fluctuates when the number of rotations and the torque are in certain ranges. The occurrence of this phenomenon, or the transmitted torque fluctuation, shortens the life of the friction member and generates noises from members on the motive-force transmission path.

One or more embodiments of the present invention improves the stability of torque transmitted through a friction engagement element.

One or more embodiments of the present invention provides a friction engagement element including: a friction member consisting primarily of a resin; and a metal member having a sliding surface slidable on the friction member. The friction member includes an aged layer formed at the outermost layer thereof and a hardened layer formed in abutment with the inner side of the aged layer in the thickness direction of the friction member. Moreover, the sliding surface of the metal member has a plurality of recesses and a transferred film of the aged layer of the friction member transferred and adhered to the inside of the recesses through the sliding between the friction member and the metal member.

According to one or more embodiments of the present invention, the transferred film of the aged layer is formed on the sliding surface of the metal member, and the transferred film and the friction member come into frictional contact with each other. In this way, the stability of the torque transmitted through the friction engagement element can be improved.

DETAILED DESCRIPTION

Embodiments of the present invention will be explained below with reference to the drawings. Note that similar components in the illustration of the drawings will be denoted by the same reference sign and overlapping explanation thereof will be omitted. Also, the dimensional ratios in the drawings may be exaggerated for the sake of explanation and be different from the actual ones. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

An example where a friction engagement element according to a first embodiment of the present invention is applied to a hybrid driving-force transmission device S will be explained with reference to FIGS. 1 to 3(c).

Figure 1:
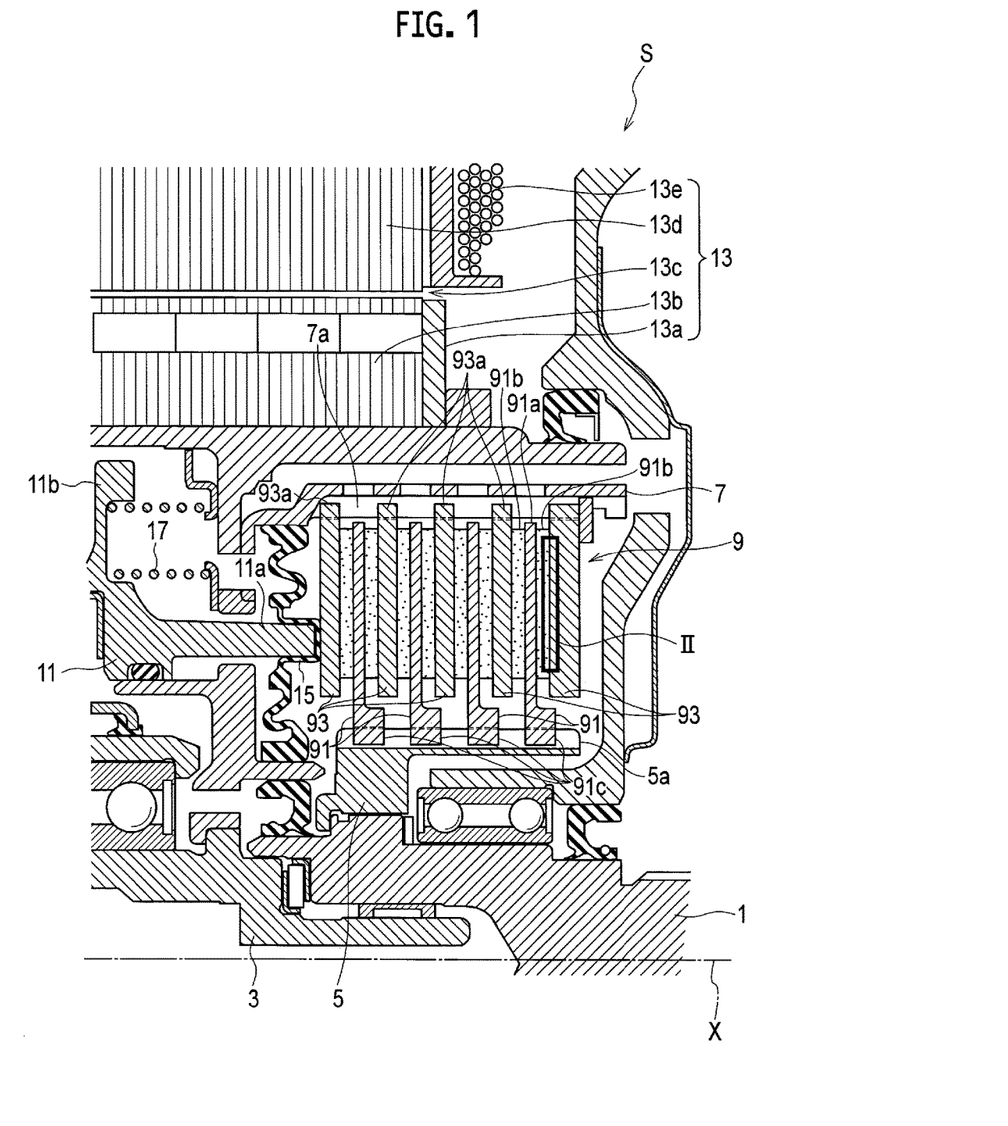
FIG. 1 is a cross-sectional view showing the main components of a hybrid driving-force transmission device to which a friction engagement element according to one or more embodiments of the present invention is applied.

As shown in FIG. 1, the hybrid driving-force transmission device S includes: a clutch hub shaft 1 coupled to the output shaft of an engine (not shown) through a damper; a clutch cover shaft 3 disposed coaxially with the clutch hub shaft 1 and coupled to the input shaft (not shown) of a transmission; a clutch hub 5 coupled to the clutch hub shaft 1; a clutch cover 7 coupled to the clutch cover shaft 3; a normally-open dry multi-plate clutch 9 provided between the clutch hub 5 and the clutch cover 7; a slave cylinder 11 configured to control the engagement and disengagement of the clutch 9; and a motor generator 13.

The clutch 9 includes a plurality of drive plates 91 and a plurality of driven plates (metal members) 93 which are arranged alternately in the direction of a rotation axis X of the clutch 9. Each drive plate 91 is spline-fitted axially movably on the clutch hub 5. Each driven plate 93 is spline-fitted axially movably in the clutch cover 7.

The slave cylinder 11 is a hydraulic actuator and includes a rod 11a which is movable in the direction of the rotation axis X. The slave cylinder 11 is configured to apply pressing force to the clutch 9 in the direction of the rotation axis X through this rod 11a and a pressing plate 15 elastically supported on the clutch cover 7. A return spring 17 is interposed between the clutch cover 7 and a flange portion 11b which is provided on the base end side of the rod 11a.

To engage the clutch 9, a hydraulic pressure generated at the transmission is supplied to the slave cylinder 11 to move the rod 11a toward the clutch 9 (toward the right in FIG. 1) against the urging force from the return spring 17. As a result, an engaging force, which is the difference between the hydraulic force and the urging force, is transmitted to the clutch 9 through the rod 11a and the pressing plate 15, so that the drive plates 91 and the driven plates 93 are pressed against each other and the clutch 9 is engaged.

To disengage the clutch 9, the hydraulic pressure that has been supplied to the slave cylinder 11 is released, so that the rod 11a is moved in a direction away from the clutch 9 (toward the left in FIG. 1) by the urging force from the return spring 17. As a result, the engaging force that has been transmitted to the clutch 9 through the rod 11a and the pressing plate 15 is released and the clutch 9 is disengaged.

The motor generator 13 is a synchronous AC motor and includes a rotor support frame 13a which is formed integrally with the clutch cover 7 and a motor rotor 13b which is supported on and fixed to the rotor support frame 13a and in which permanent magnets are embedded. The motor generator 13 further includes a motor stator 13d which is disposed on the outer side of the motor rotor 13b with an air gap 13c therebetween and stator coils 13e which are wound around the motor stator 13d.

When the clutch 9 is disengaged, the hybrid driving-force transmission device S shifts to an "electric-vehicle driving mode" in which the motor generator 13 and the input shaft of the transmission are coupled to each other through the clutch cover 7 and the clutch cover shaft 3. When the clutch 9 is then engaged, the hybrid driving-force transmission device S shifts to a "hybrid-vehicle driving mode" in which the motor generator 13 and the engine are coupled to each other through the clutch hub 5 and the clutch hub shaft 1 which are coupled to the clutch cover 7 through this clutch 9. In sum, the clutch 9 allows transition of the driving mode of a hybrid electric vehicle by disconnecting or connecting the transmission of the driving force from the engine.

[Friction Engagement Element]

As shown in FIG. 1, each drive plate 91 includes a cushion plate 91a and friction members 91b fixed to the opposite surfaces of the cushion plate 91a. Internal splines 91c are provided in the inner periphery of the cushion plate 91a, the internal splines 91c being configured to be spline-fitted on external splines 5a provided on the outer peripheral surface of the clutch hub 5.

Figure 2:
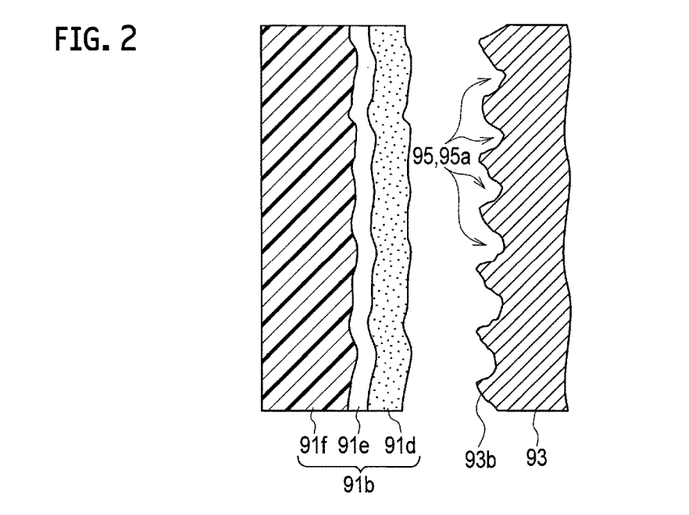
FIG. 2 is an enlarged cross-sectional view of a section II in FIG. 1.
Figure 3:
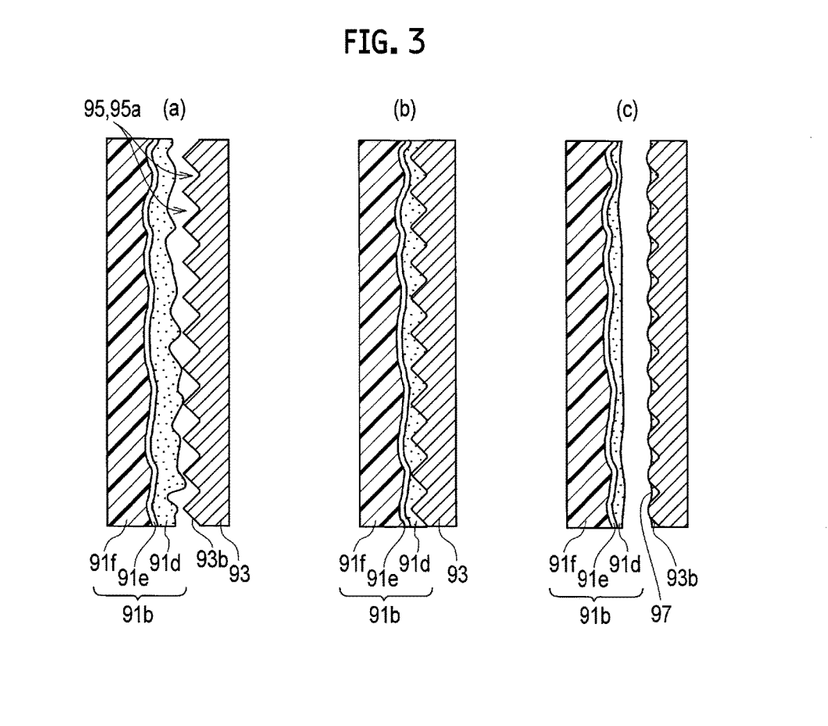
FIGS. 3(a)-3(c) are views showing processes through a transferred film is formed on a sliding surface in each of friction engagement elements according to first and second embodiments, FIG. 3(a) showing a state where the friction engagement element has never been used, FIG. 3(b) showing a state where the friction engagement element is engaged for the first time, and FIG. 3(c) showing a state where the transferred film is formed on the sliding surface after the start of use.

Each driven plate 93 is a metal circular plate. External splines 93a are provided on the outer periphery of the driven plate 93, the external splines 93a being configured to be spline-fitted in internal splines 7a provided in the inner peripheral surface of the clutch cover 7. As shown in FIG. 2, a sliding surface 93b is provided on each of the sides of the driven plate 93 facing the friction members 91b, the sliding surface 93b being configured to slide on the friction member 91b. In this description, the sliding surface 93b of the driven plate 93 and the surface of the friction member 91b configured to slide on the sliding surface 93b will also be referred to as "friction surfaces."

The above friction members 91b and the above driven plates 93 with the sliding surfaces 93b slidable on these friction members 91b constitute the friction engagement element.

[Friction Member]

Each friction member 91b consists primarily of a resin. For example, the friction member 91b is made of the resin by 70 to 90% by volume and other materials such as a fibrous base material and a rubber material.

As the resin, a thermosetting resin can be used such for example as phenolic resin, one of various modified phenolic resins, melamine resin, epoxy resin, or unsaturated polyester resin. The friction member 91b may contain a thermoplastic resin for the purpose of adjusting its porosity and the like.

As the fibrous base material, a fiber can be used which is selected as appropriate from inorganic fibers such as glass fiber, ceramic fiber, and rock wool, metal fibers such as copper wire and brass wire, or organic fibers such as aromatic polyamide fiber, rayon, and acrylonitrile fiber. The fibrous base material is in the form of yarn, roving, ribbon, braid, or the like, and a body made from the above fiber, either a filament or staples, can be used.

The rubber material is not particularly limited. For example, acrylonitrile-butadiene rubber (NBR), styrene-butadiene rubber (SBR), isoprene rubber (IR), butadiene rubber (BR), ethylene-propylene rubber (EPM), butyl rubber, chloroprene rubber (CR), chlorosulfonated polyethylene (CSM), acrylic rubber (ACM), urethane rubber (U), silicone rubber (Si), fluororubber (FPM), polysulfide rubber (T), polyether rubber (POR), or the like can be used.

As shown in FIG. 2, an aged layer 91d is formed at the outermost layer of the friction member 91b, i.e., at the layer of the friction member 91b facing the sliding surface 93b of the driven plate 93.

Generally, an "aged layer" refers to a carbonized layer that gradually grows in a friction member inwardly from its friction surface as a result of repetitive input of frictional heat generated by the friction between the friction member and its counterpart into the friction member.

The aged layer 91d in this embodiment is formed by subjecting the friction member 91b to later-described reheating treatment and is a layer formed at the outermost layer in the surface of the friction member 91b heated in the reheating treatment. It is a carbonized layer having properties similar to those of the "aged layer" mentioned above, and its thickness is set as appropriate in accordance with the surface profile (including surface roughness), surface properties (including hardness), and the like of the sliding surface 93b of the driven plate 93 and is set to about several dozen μm, for example.

A hardened layer 91e is formed in abutment with the aged layer 91d on the inner side of the aged layer 91d in the thickness direction of the friction member 91b. The hardened layer 91e is a layer formed between a base material 91f and the aged layer 91d of the friction member 91b by subjecting the friction member 91b to the reheating treatment. It is a sulfur-rich carbonized layer having higher hardness than the hardness of the base material 91f and the aged layer 91d. The thickness of the hardened layer 91e is about 2 to 3 μm (thin film thickness).

The method of manufacturing the friction member 91b includes steps such as a fiber knitting step, a rubber adhering step, a molding and calcining step, a grinding and polishing step, and reheating treatment.

In the fiber knitting step, the fibrous base material, which is made for example of a glass fiber, is coated with the thermosetting resin.

In the rubber adhering step, a compounded rubber is adhered to the fibrous base material. The compounded rubber is not particularly limited and may be the rubber material mentioned above containing agents such as a vulcanizing agent, a vulcanization accelerator, a vulcanization aid, and a friction enhancer. As the vulcanizing agent, sulfur, zinc oxide, magnesium oxide, peroxide, dinitrobenzene, or the like is used, for example. As the vulcanization accelerator, a thiazole-based accelerator, a polyamine-based accelerator, a sulfonamide-based accelerator, a dithiocarbamate-based accelerator, an aldehyde amine-based accelerator, a guanidine-based accelerator, a thiourea-based accelerator, a xanthate-based accelerator, or the like is used, for example. As the vulcanization aid, a metal oxide such as zinc white or a fatty acid such as stearic acid or oleic acid is used, for example. As the friction enhancer, clay, talc, barium sulfate, cashew dust, graphite, lead sulfate, tripoli (siliceous limestone), or the like is used, for example.

In the molding and calcining step, the fibrous base material with the compounded rubber adhered thereto is shaped into an annular circular plate shape by rolling the fibrous base material into, for example, a spiral pattern or a thermoid pattern or by a similar method. The shaped fibrous base material is then placed inside a die and pressurized, and subjected to heating and pressure molding at a temperature of about 150 to 200° C., for example. Thereafter, heating treatment is performed for about 5 hours in an atmosphere at a temperature of 200 to 250° C., for example.

In the grinding and polishing step, the molded body molded into a predetermined shape in the molding and calcining step is cut (ground) and polished into a friction member 91b having a predetermined product shape.

In this embodiment, after the grinding and polishing step, the friction member 91b is further subjected to the reheating treatment. By this reheating treatment, the aged layer 91d is formed at the outermost layer of the friction member 91b. The conditions for the reheating are not particularly limited and can be set as appropriate in accordance with the components of the resin used and the required thickness and properties of the aged layer 91d. If the friction member 91b consists primarily of phenolic resin, the friction member 91b is heated for about 3 hours at a temperature which is about 30° C. higher than the temperature of the calcining step and at which the base material and the resin start thermal degradation, for example.

Note that the timing of the grinding and polishing step is not limited to the above timing. The grinding and polishing step may be performed after the reheating treatment as long as the aged layer 91d formed at the outermost layer can be left there.

[Driven Plate (Metal Member)]

The material of each driven plate 93 is not particularly limited and can be selected as appropriate from an aluminum-based material, a copper-based material, a steel material, and the like in accordance with the required specifications. As the steel material, carbon steel, stainless steel, silicon steel, or the like can be used. Typical examples include S35C, S55C, SPC, SAPH370, SAPH440, and the like specified by Japanese Industrial Standards. The driven plate 93 can be manufactured by various methods such as sheet metal stamping and sintering.

The sliding surface 93b of the driven plate 93 has been subjected to surface roughening substantially over the entire area thereof. As a result, a plurality of recesses 95 for the sliding surface 93b to retain a transferred film 97 of the aged layer 91d are formed in the sliding surface 93b in such a way as to be spread substantially evenly over the entire area thereof. As will be described later, by the sliding between the friction member 91b and the sliding surface 93b, the plurality of recesses 95 scrape the aged layer 91d of the friction member 91b, transfer it onto the sliding surface 93b, and retain the transferred film 97. The transferred film 97 retained in the recess 95 is either filled in the entire inner space of the recess 95 or filled in part of the inner space of the recess 95 (e.g. closing the opening of the recess 95 or fixedly adhering to the bottom of the recess 95).

The surface roughening is performed such that the depth of the plurality of recesses 95 is smaller than the thickness of the aged layer 91d of the friction member 91b in a state where the friction engagement element has never been used. Here, focusing on recesses 95 and the protrusions formed therebetween, the depth of each recess 95 is the sum of the greatest value in height of the protrusions and the greatest value in depth of the recess 95 from the mean line of their profile. The thickness of the aged layer 91d is the width of the aged layer 91d in the thickness direction of the friction member 91b (corresponding to the direction of the rotation axis X in this embodiment) (the depth of the aged layer 91d in the direction perpendicular to the friction surface of the friction member 91b).

[Transferred-Film Forming Processes]

In a state where the friction engagement element has never been used, that is, in a state where the clutch 9 formed of this friction engagement element has never been engaged, the transferred film 97 of the aged layer 91d is not yet formed on the sliding surface 93b of the driven plate 93, as shown in FIG. 3(a). FIG. 3(b) shows a state where the clutch 9 including the friction engagement element is engaged for the first time. FIG. 3(c) shows a state where the transferred film 97 is formed on the sliding surface 93b. Note that FIG. 3(c) shows a state where the tips of the protrusions formed between the adjacent recesses 95 have been rounded by the friction with the aged layer 91d and the hardened layer 91e of the friction member 91b. The following will explain processes through which the transferred film 97 is formed on the sliding surface 93b by the sliding between the friction member 91b and the driven plate 93.

The transferred film 97 is formed through the following processes (1) to (5).

(1) The friction engagement element is in a transitioning state between the engaged state and the disengaged state during a period from the start to the completion of clutch engagement or from the start to the completion of clutch disengagement. In this transitioning state, the aged layer 91d of the friction member 91b slides on the sliding surface 93b of the driven plate 93 while being pressed against the sliding surface 93b at a predetermined surface pressure.

(2) In doing so, at the friction interface between the friction member 91b and the driven plate 93, part of the aged layer 91d is scraped by the friction with the sliding surface 93b of the driven plate 93 and departs from the friction member 91b in the form of wear debris (transfer particles).

(3) The wear debris of the aged layer 91d departing from the friction member 91b is in a semi-molten state or in a solid-liquid coexisting state as a result of receiving the friction heat generated by the friction between the driven plate 93 and the friction member 91b. The wear debris in such a state is captured in the plurality of recesses 95, which are formed in the sliding surface 93b, and attached to the inner surfaces of the recesses 95.

(4) After the clutch 9 shifts to the engaged state or the disengaged state and stops generating the friction heat, the wear debris attached to the inside of the recesses 95 is cooled and adhered to the recesses 95. Thus, the wear debris of the aged layer 91d is transferred and adhered to and retained in the recesses 95.

(5) As the clutch engaging operation is performed several times, the above series of processes from the departure to the adhesion of the aged layer 91d is repeated, so that particles of the wear debris transferred and adhered to each recess 95 are connected to each other and form a thin transferred film 97.

Since the plurality of recesses 95 are formed in the sliding surface 93b in such a way as to be spread substantially evenly over the entire area of the sliding surface 93b, the transferred film 97 formed through the above processes is likewise spread substantially evenly over the entire area of the sliding surface 93b. Also, the transferred film 97 has components similar to the components of the aged layer 91d. Thus, with the above processes, it is possible to easily transplant the components of the aged layer 91d onto the sliding surface 93b or transfer the properties of the friction surface of the friction member 91b to the sliding surface 93b.

In this embodiment, since the transferred film 97 from the aged layer 91d is formed on the sliding surface 93b of the driven plate 93, the friction member 91b comes into frictional contact with the transferred film 97 as well. In this way, even when transmitted torque fluctuates while the clutch is engaged, the amplitude thereof can be suppressed. Hence, the torque transmitted through the friction engagement element can be stabilized.

Also, since the transferred film 97 of the aged layer 91d is disposed inside of the recesses 95, which are provided in the sliding surface 93b, the transferred film 97 is stably retained on the sliding surface 93b. In this way, the frictional force can be stabilized, which leads to improvement in the stability of the torque transmitted through the friction engagement element.

Further, since the friction member 91b includes the hardened layer 91e in abutment with the aged layer 91d, the hardened layer 91e can retard the progression of the wear of the friction member 91b after the aged layer 91d of the friction member 91b is transferred and adhered onto the sliding surface 93b of the driven plate 93. Also, since the hardened layer 91e can round the protrusions on the sliding surface 93b of the driven plate 93, the hardened layer 91e can further retard the progression of the wear of the friction member 91b.

Also, since the depth of the plurality of recesses 95 is smaller than the thickness of the aged layer 91d of the friction member 91b, the aged layer 91d can be prevented from being worn out before the transferred film 97 is stably formed on the sliding surface 93b. In this way, the hardened layer 91e can fulfill its function more effectively.

Second Embodiment

A friction engagement element according to a second embodiment of the present invention will be explained. This embodiment is an example where fine recesses 95a formed by blasting are employed as the plurality of recesses 95 in the first embodiment. Note that the other features are similar to those in the above embodiment. Thus, in this embodiment, similar members will be denoted by the same reference sign and detailed explanation thereof will be omitted.

In this embodiment, the sliding surface 93b is subjected to blasting such as shot blasting to form the fine recesses 95a (see FIGS. 2 and 3(a)-3(c) in the sliding surface 93b. The surface roughness of the sliding surface 93b is specified within a predetermined range and in particular set to a surface roughness Rz between 3 μm and 10 μm inclusive. The surface roughness Rz is the maximum height roughness defined in a Japanese Industrial Standard (JIS-B-0601: 2001). Note that the fine recesses 95a can be formed by other methods than blasting such as etching and electrical-discharge machining.

The friction engagement element according to this embodiment may achieve advantageous effects similar to those by the first embodiment since the fine recesses 95a function as the plurality of recesses 95 in the first embodiment.

Also, the fine recesses 95a, which are formed by blasting, have uneven, irregular cross-sectional shapes and can therefore more securely retain the transferred film 97.

Further, the tips of the protrusions formed between the fine recesses 95a, which are formed by blasting, are easily worn and easily plastically deformed and are therefore easily rounded by the friction with the hardened layer 91e of the friction member 91b. Also, the tips of the protrusions are rounded from the start of use by scraping the aged layer 91d and are then further rounded when reaching the hardened layer 91e. In this way, the run-in of the two friction surfaces can be done quickly.

Further, since the surface roughness Rz of the sliding surface 93b is set between 3 μm and 10 μm inclusive, the aged layer 91d is scraped adequately by the sliding between the friction member 91b and the driven plate 93. Hence, the transferred film 97 can be formed sufficiently.

To evaluate the stability of the torque transmitted through the friction engagement element according to this embodiment, the torque transmission characteristics of the friction engagement element were evaluated using a low-velocity sliding-friction testing machine (manufactured by Automax Company Limited) capable of JASO (Japan Automobile Standardization Organization) M349-2012 test.

Figure 4:
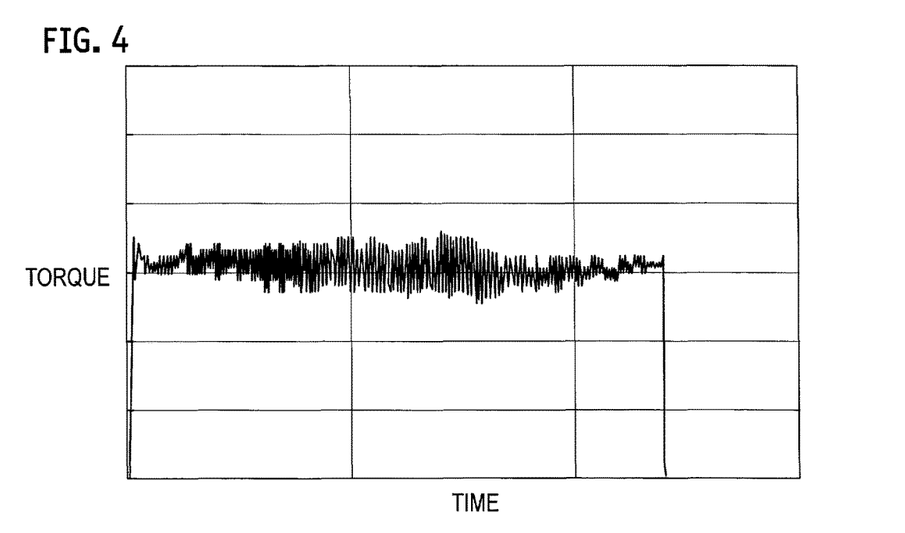
FIG. 4 is a graph showing the torque transmission characteristics of the friction engagement element according to the second embodiment of the present invention.

The torque transmitted to the driven plate 93 side when the friction member 91b was rotated while being pressed against the sliding surface 93b of the driven plate 93 was measured. The pressing force was kept constant (e.g. at 490 N), and the number of rotations was raised from 0 rpm to 500 rpm in 5 seconds, held at 500 rpm for 2 seconds, and then lowered from 500 rpm to 0 rpm in 5 seconds. FIG. 4 shows the result obtained.

The curve in the graph in FIG. 4 represents the magnitude of the transmitted torque. From the graph, the amplitude of the transmitted torque was found to be suppressed to about 25 to 35% of the magnitude of the target torque.

Moreover, after the test, the aged layer 91d of the friction member 91b was found to be transferred and adhered onto the sliding surface 93b of the driven plate 93 in such a way as to be spread substantially evenly over the entire area of the sliding surface 93b. Further, the transferred aged layer 91d was found to be firmly filled in the fine recesses 95a. This then shows that the fine recesses 95a, which are formed by blasting on the sliding surface 93b, have excellent retention strength on the transferred film 97 of the aged layer 91d.

Third Embodiment

Figure 6:
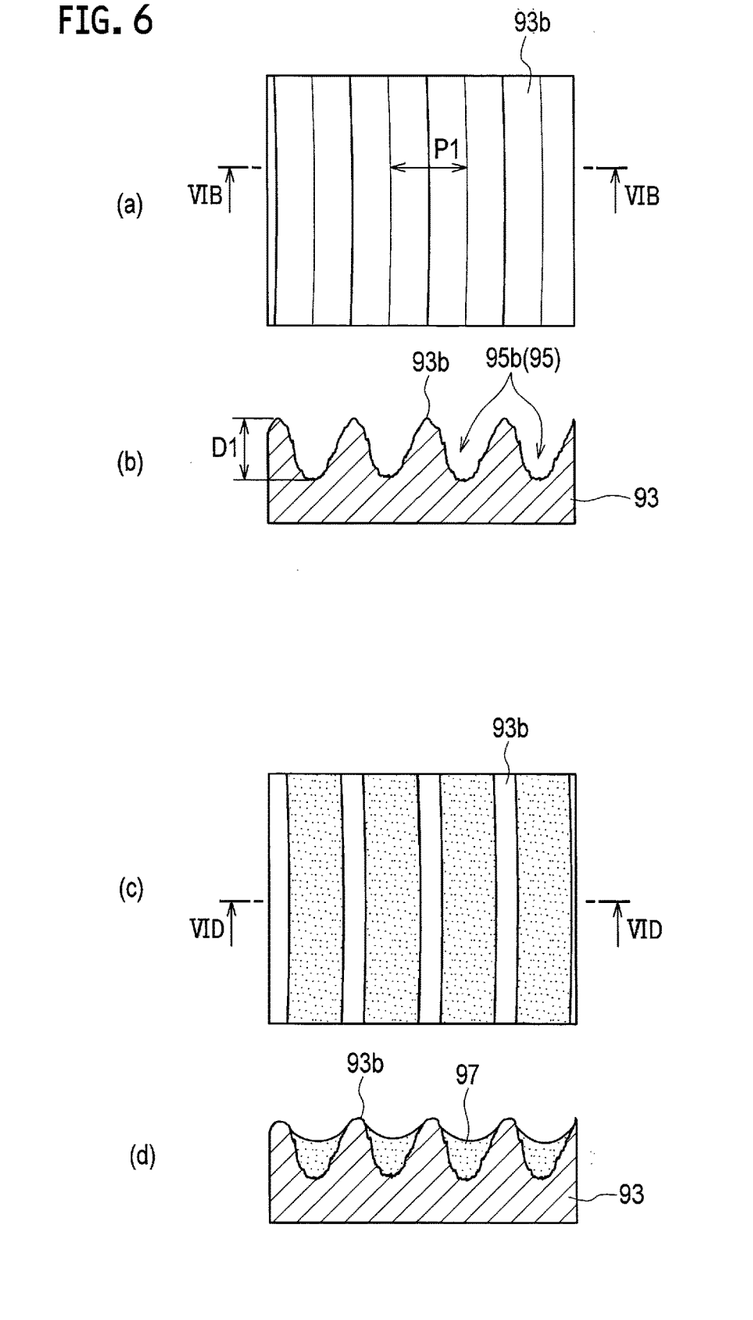
FIGS. 6(a)-6(d) are enlarged views showing a section VI in FIG. 5, FIGS. 6(a) and 6(b) showing a state where the friction engagement element has never been used and FIGS. 6(c) and 6(d) showing a state where transferred film is formed on a sliding surface after the start of use, with FIG. 6(b) being a cross-sectional view taken along a line VIB-VIB in FIG. 6(a) and with FIG. 6(d) being a cross-sectional view taken along a line VID-VID in FIG. 6(c).
Figure 7:
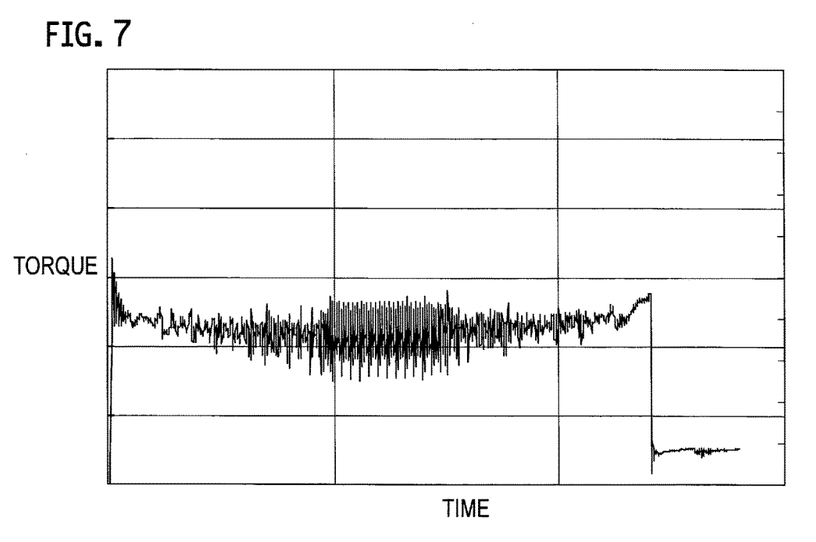
FIG. 7 is a graph showing the torque transmission characteristics of the friction engagement element according to the third embodiment.

A friction engagement element according to a third embodiment of the present invention will be explained with reference to FIGS. 5 to 7. This embodiment is an example where a plurality of annularly extending grooves 95b are employed as the plurality of recesses 95 in the first embodiment. Note that the other features are similar to those in the above embodiments. Thus, in this embodiment, similar members will be denoted by the same reference sign and detailed explanation thereof will be omitted.

Figure 5:
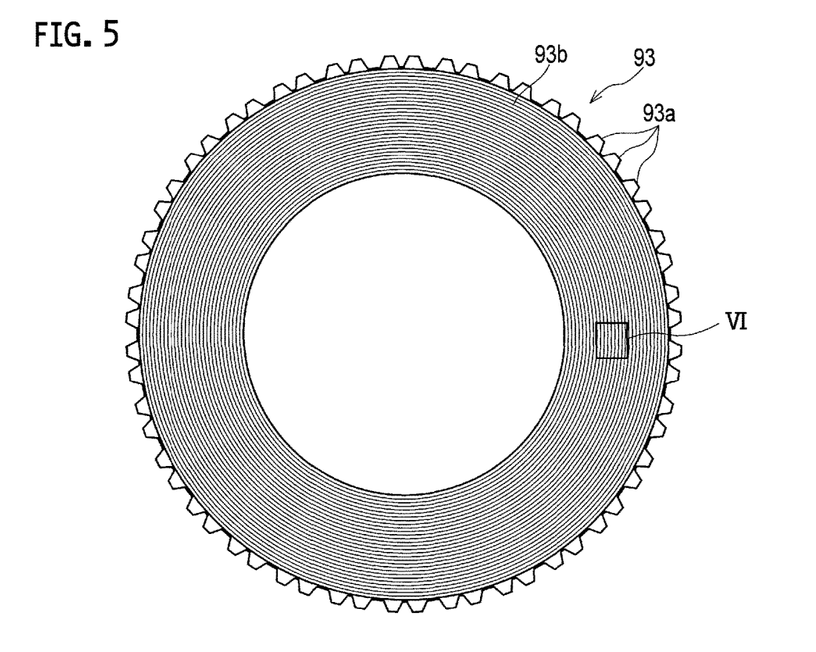
FIG. 5 is a view showing a driven plate of a friction engagement element according to a third embodiment of the present invention.

As shown in FIG. 5, the plurality of grooves 95b extend substantially concentrically about a predetermined spot on the driven plate 93 (the rotation axis X of the clutch 9). The plurality of grooves 95b can be formed by subjecting the sliding surface 93b of the driven plate 93 to cutting, for example.

Depth D1 (see FIGS. 6(a)-6(d)) of the grooves 95b is not particularly limited and can be set as appropriate in accordance with the material of the driven plate 93, the materials of the friction member 91b, the thickness and properties of the aged layer 91d, and the like. According to one or more embodiments of the present invention, the depth D1 is set between 6 µm and 16 µm inclusive so that the grooves 95b can have excellent retention strength on the transferred film 97. According to one or more embodiments of the present invention, the depth D1 is set between 8 µm and 14 µm inclusive. According to one or more embodiments of the present invention, the depth D1 is set between 10 µm and 12 µm inclusive so that the life of the friction member 91b can be longer.

Pitch P1 of the grooves 95b can also be set as appropriate in accordance with the materials of the friction member 91b, the properties of the aged layer 91d, and the like. The pitch P1 is set advantageously between 0.1 mm and 0.5 mm inclusive so that the grooves 95b can have excellent retention strength on the transferred film 97. Moreover, according to one or more embodiments of the present invention, the pitch P1 is set between 0.15 mm and 0.4 mm inclusive. According to one or more embodiments of the present invention, the pitch P1 is set between 0.2 mm and 0.3 mm inclusive so that the life of the friction member 91b can be longer.

As shown in FIGS. 6(a)-6(b), in a state where the friction engagement element according to this embodiment has never been used, the aged layer 91d is not yet transferred and adhered to the inside of the plurality of grooves 95b and thus the transferred film 97 is not yet formed on the sliding surface 93b. After the start of use, the transferred-film forming processes mentioned above are performed, thereby transferring the aged layer 91d of the friction member 91b to the inside of the plurality of grooves 95b. As a result, as shown in FIGS. 6(c)-6(d), the transferred film 97 is formed on the sliding surface 93b. Meanwhile, the tips of the protrusions formed between the adjacent grooves 95b are rounded by the friction with the aged layer 91d and the hardened layer 91e of the friction member 91b.

The friction engagement element according to this embodiment may achieve advantageous effects similar to those by the first embodiment since the plurality of grooves 95b function as the plurality of recesses 95 in the first embodiment.

Also, in this embodiment, since the grooves 95b extending concentrically about the predetermined spot on the driven plate 93 are provided as the recesses 95, the coefficient of friction in the circumferential direction of these circles can be reduced. In addition, since the protrusions formed between the grooves 95b also extend concentrically, the wear of the friction member 91b and the sliding surface 93b of the driven plate 93 can be suppressed.

Further, in this embodiment, since the depth D1 of the grooves 95b is set between 6 µm and 16 µm inclusive, the grooves 95b have excellent retention strength on the transferred film 97. In this way, the amplitude of the torque transmitted through the friction engagement element can be small.

To evaluate the stability of the torque transmitted through the friction engagement element according to this embodiment, the torque transmission characteristics of the friction engagement element were evaluated using a method and conditions similar to those in the second embodiment. From the graph in FIG. 7, the amplitude of the transmitted torque was found to be suppressed to about 30 to 50% of the magnitude of the target torque. Moreover, the torque transmitted through the friction engagement element according to this embodiment was found to be lower than that in the second embodiment.

Note that the plurality of grooves 95b according to this embodiment can be employed in combination with the fine recesses 95a in the second embodiment. For example, the sliding surface 93b of the driven plate 93 may be subjected to cutting to form the plurality of grooves 95b therein and thereafter subjected to blasting. In this way, the fine recesses 95a can be formed over the plurality of grooves 95b. This combination example may achieve at the same time the advantageous effects by this embodiment and the advantageous effects by the second embodiment.

Fourth Embodiment

Figure 8:
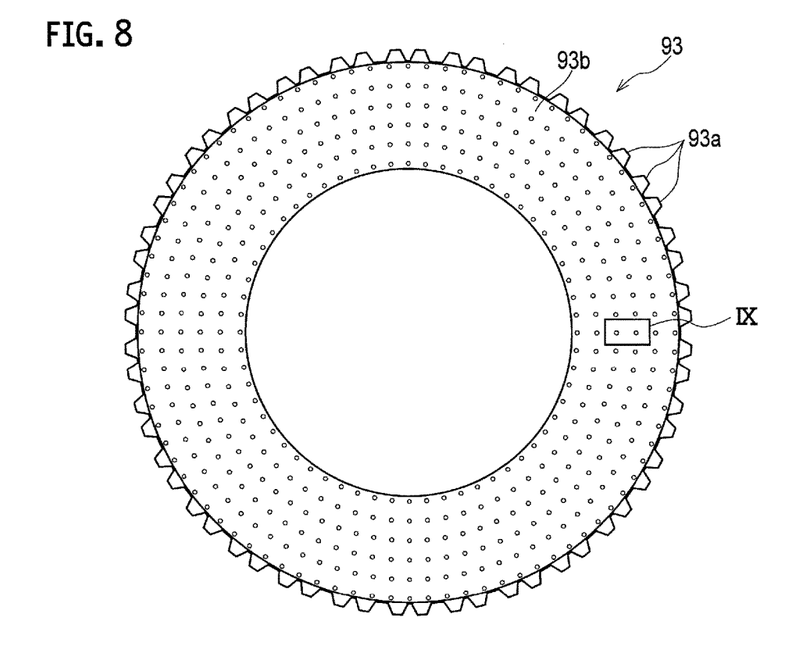
FIG. 8 is a view showing a driven plate of a friction engagement element according to a fourth embodiment of the present invention.
Figure 9:
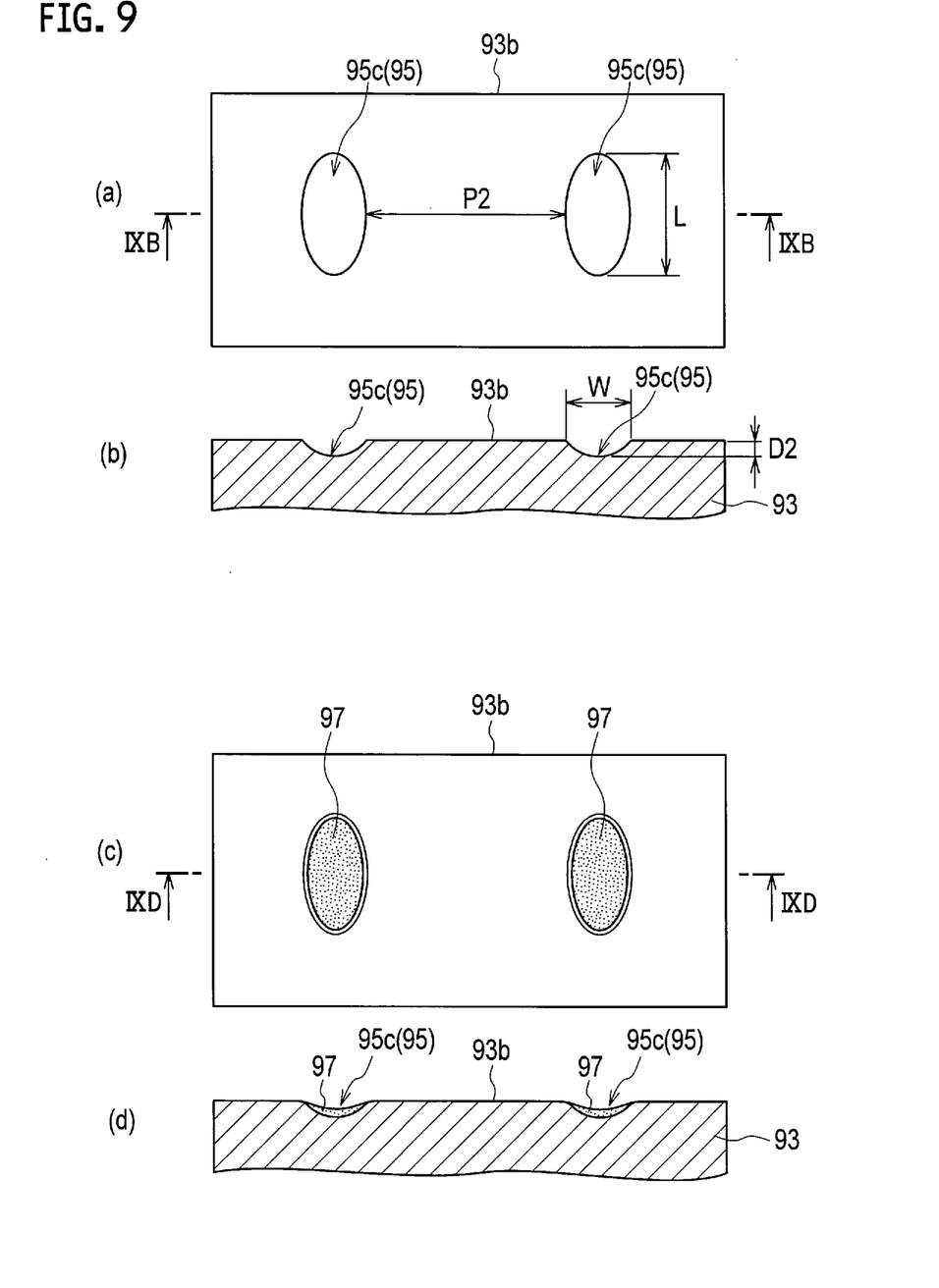
FIGS. 9(a)-9(d) are enlarged views showing a section IX in FIG. 8, FIGS. 9(a) and 9(b) showing a state where the friction engagement element has never been used and FIGS. 9(c) and 9(d) showing a state where transferred films are formed on a sliding surface after the start of use, with FIG. 9(b) being a cross-sectional view taken along a line IXB-IXB in FIG. 9(a) and with FIG. 9(d) being a cross-sectional view taken along a line IXD-IXD in FIG. 9(c).
Figure 10:
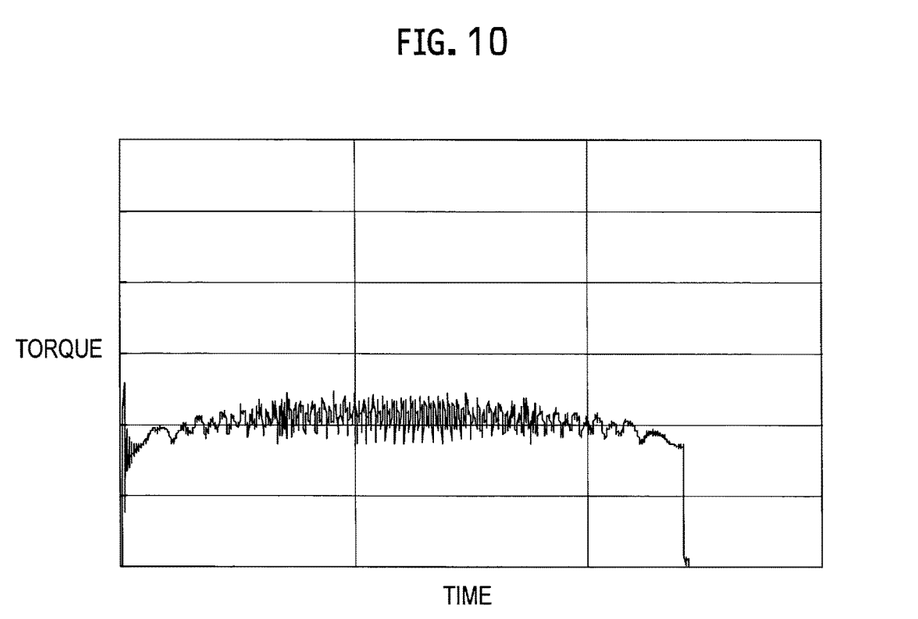
FIG. 10 is a graph showing the torque transmission characteristics of the friction engagement element according to the fourth embodiment.

A friction engagement element according to a fourth embodiment of the present invention will be explained with reference to FIGS. 8 to 10. This embodiment is an example where, as shown in FIG. 8, a plurality of depressions 95c formed in the sliding surface 93b at a predetermined interval are employed as the plurality of recesses 95 in the first embodiment. Note that the other features are similar to those in the above embodiments. Thus, in this embodiment, similar members will be denoted by the same reference sign and detailed explanation thereof will be omitted.

The plurality of depressions 95c are formed by subjecting the sliding surface 93b of the driven plate 93 to dimpling. Specifically, each depression 95c is formed by pressing a protrusion against the sliding surface 93b such that the protrusion digs into the base material, the protrusion having higher hardness than the surface hardness of the sliding surface 93b. The plurality of depressions 95c can be easily formed, for example, by pressing a roller against the sliding surface 93b and rolling the roller on the sliding surface 93b, the roller being provided with a plurality of the protrusions on the side surface thereof. The surface roughness of the inner surface of each of the depressions 95c may be higher than the surface roughness of the area on the sliding surface 93b other than the depressions 95c. In this way, the retention strength of the depressions 95c on the transferred film 97 can be enhanced. Note that the depressions 95c can also be formed by cutting, laser beam machining, or the like.

In a front view of the sliding surface 93b, each depression 95c is in an elliptical or oval shape longer in the circumferential direction of the driven plate 93. Length L (major-axis diameter) of the depression 95c in the circumferential direction of the driven plate 93 is greater than width W (minor-axis diameter) of the depression 95c in the radial direction of the driven plate 93.

The width W and length L (these will also be referred to simply collectively as "width") of the depression 95c are not particularly limited and can be set as appropriate in accordance with the diameter of the driven plate 93, the materials of the friction member 91b, the properties of the aged layer 91d, and the like. According to one or more embodiments of the present invention, the width W and the length L are set at 0.5 mm or greater and at 2.3 mm or smaller, respectively, so that the depression 95c can have excellent retention strength on the transferred film 97. Moreover, according to one or more embodiments of the present invention, the width W and the length L are set at 0.6 mm or greater and at 2.0 mm or smaller, respectively. According to one or more embodiments of the present invention, the width W and the length L are set at 0.7 mm or greater and at 1.7 mm or smaller, respectively, so that the life of the friction member 91b can be longer.

Depth D2 of the depression 95c is not particularly limited and can be set as appropriate in accordance with the material of the driven plate 93, the materials of the friction member 91b, the thickness and properties of the aged layer 91d, and the like. According to one or more embodiments of the present invention, the depth D2 is set between 3 µm and 9 µm inclusive so that the depression 95c can have excellent retention strength on the transferred film 97. Moreover, according to one or more embodiments of the present invention, the depth D2 is set between 4 µm and 7 µm inclusive. According to one or more embodiments of the present invention, the depth D2 is set between 4.5 µm and 5.5 µm inclusive so that the life of the friction member 91b can be longer.

The interval between the depressions 95c is not particularly limited and can be set as appropriate in accordance with the material of the driven plate 93, the materials of the friction member 91b, the properties of the aged layer 91d, and the like. For example, the shortest distance from the edge of a depression 95c to the edge of a depression 95c adjacent to that depression 95c on the sliding surface 93b (e.g. P2 in FIG. 9(a)) can be set within the range of 1.0 to 5.0 times the length L.

The layout of the depressions 95c is not particularly limited and lines of depressions 95c may be arranged concentrically or spirally on the sliding surface 93b. The depressions 95c in each line may be arranged at an equal interval or at unequal intervals. Alternatively, the depressions 95c may be arranged randomly on the sliding surface 93b.

As shown in FIGS. 9(a)-9(b), in a state where the friction engagement element according to this embodiment has never been used, the aged layer 91d is not yet transferred and adhered onto the plurality of depressions 95c and thus the transferred film 97 is not yet formed on the sliding surface 93b. After the start of use, the transferred-film forming processes mentioned above are performed, thereby transferring the aged layer 91d of the friction member 91b to the inside of the plurality of depressions 95c. As a result, as shown in FIGS. 9(c) and 9(d), the transferred films 97 are formed on the sliding surface 93b.

The friction engagement element according to this embodiment may achieve advantageous effects similar to those by the first embodiment since the plurality of depressions 95c function as the plurality of recesses 95 in the first embodiment.

Also, in this embodiment, the amount of transfer of the aged layer 91d can be controlled by providing the plurality of depressions 95c formed at predetermined intervals. In this way, it is possible to reduce the amount of wear of the friction member 91b while reducing the coefficient of friction.

Further, in this embodiment, the depth D2 of each depression 95c is set between 3 µm and 9 µm inclusive and the width (width W and length L) of the depression 95c is set between 0.5 mm and 2.3 mm inclusive. In this way, the depression 95c has excellent retention strength on the transferred film 97. Hence, the amplitude of the torque transmitted through the friction engagement element can be small.

To evaluate the stability of the torque transmitted through the friction engagement element according to this embodiment, the torque transmission characteristics of the friction engagement element were evaluated using a method and conditions similar to those in the second and third embodiments. From the graph in FIG. 10, the amplitude of the transmitted torque was found to be suppressed to about 25 to 35% of the magnitude of the target torque. Moreover, the torque transmitted through the friction engagement element according to this embodiment was found to be lower than that in the second embodiment.

Note that the plurality of depressions 95c according to this embodiment can be employed in combination with the fine recess 95a in the second embodiment. For example, the sliding surface 93b of the driven plate 93 may be subjected to blasting to form the fine recesses 95a and then be subjected to the dimpling mentioned above. In this way, the fine recesses 95a can be formed on the area on the sliding surface 93b other than the depressions 95c.

Also, the plurality of depressions 95c according to this embodiment can be employed in combination with the plurality of grooves 95b in the third embodiment. For example, the sliding surface 93b of the driven plate 93 may be subjected to cutting to form the plurality of grooves 95b and then be subjected to the dimpling mentioned above. In this way, the grooves 95b can be formed on the area on the sliding surface 93b other than the depressions 95c (the area on the sliding surface 93b between the depressions 95c).

Further, the plurality of depressions 95c according to this embodiment can be employed in combination with the combination of the second embodiment and the third embodiment.

Each of these combination examples may achieve at the same time the advantageous effects by the embodiments involved in the combination.

While the embodiments of the present invention have been explained above, these embodiments are merely exemplary illustration described to facilitate the understanding of the present invention and the present invention is not limited to such embodiments. The technical scope of the present invention is not limited to the specific technical matters disclosed in the above embodiments and encompasses various modifications, changes, alternative techniques, and the like which can be easily derived therefrom.

In one or more of the above embodiments, the example has been presented in which the friction engagement element is applied to the dry multi-plate clutch 9. However, the friction engagement element according to one or more embodiments of the present invention is also applicable to other types of clutch such as a single-plate dry clutch.

Also, in one or more of the above embodiments, the example has been presented in which the friction engagement element is applied to the normally-open clutch 9. However, the friction engagement element according to one or more embodiments of the present invention is applicable also to a normally-closed clutch using a diaphragm spring or the like.

Also, in one or more of the above embodiments, the example has been presented in which the friction engagement element is applied to the hybrid driving-force transmission device S. However, the friction engagement element of one or more embodiments of the present invention is applicable also to an engine driving-force transmission device for a vehicle using only an engine as a drive source for travel and a clutch as a start clutch. Moreover, the friction engagement element of one or more embodiments of the present invention is applicable also to a motor driving-force transmission device for a vehicle using only a motor generator as a drive source for travel and a clutch as a start clutch. In sum, the friction engagement element according to one or more embodiments of the present invention is applicable to any devices as long as the devices are configured to transmit force by means of friction engagement between a friction member and a metal member, and is applicable to, for example, brake systems, dual clutch systems (DCT), automatic manual transmissions, and the like.

One or more embodiments of the present invention provides a friction engagement element including: a friction member consisting primarily of a resin; and a metal member having a sliding surface slidable on the friction member. The friction member includes an aged layer formed at the outermost layer thereof and a hardened layer formed in abutment with the inner side of the aged layer in the thickness direction of the friction member. Moreover, the sliding surface of the metal member has a plurality of recesses and a transferred film of the aged layer of the friction member transferred and adhered to the inside of the recesses through the sliding between the friction member and the metal member.

One or more embodiments of the present invention provides a friction engagement element including: a friction member consisting primarily of a resin; and a metal member having a sliding surface slidable on the friction member. The friction member includes an aged layer formed at the outermost layer thereof and a hardened layer formed in abutment with the inner side of the aged layer in the thickness direction of the friction member. The sliding surface of the metal member has a plurality of recesses which are configured to retain a transferred film of the aged layer of the friction member to be transferred and adhered to the inside of the recesses by the sliding when the friction member and the metal member slide relative to each other.

One or more embodiments of the present invention provides a dry clutch including any one of the above friction engagement elements.

One or more embodiments of the present invention provides a method of manufacturing a friction engagement element including: heating a friction member to form an aged layer at the outermost layer of the friction member and to form a hardened layer in abutment with the inner side of the aged layer in the thickness direction of the friction member; providing a plurality of recesses in the sliding surface of the metal member; and having the friction member and the metal member sliding relative to each other to have the aged layer of the friction member transferred and adhered to the inside of the recesses and thereby form a transferred film thereof on the sliding surface.

According to the friction engagement element, the dry clutch, and the method of manufacturing a friction engagement element according to one or more embodiments of the present invention, the transferred film of the aged layer is formed on the sliding surface of the metal member, and the transferred film and the friction member come into frictional contact with each other. In this way, the stability of the torque transmitted through the friction engagement element can be improved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 9 dry multi-plate clutch
91 drive plate
91b friction member
91d aged layer
91e hardened layer
93 driven plate (metal member)
93b sliding surface
95 recess
95a fine recess
95b groove
95c depression
97 transferred film

The invention claimed is:

1. A friction engagement element comprising:
a friction member comprising resin; and
a metal member having a sliding surface slidable on the friction member,
wherein the friction member comprises:
an aged layer at an outermost layer of the friction member, the aged layer being a carbonized layer, and
a hardened layer in abutment with an inner side of the aged layer in a thickness direction of the friction member, and
wherein the sliding surface of the metal member comprises:
a plurality of recesses, and
transferred film of the aged layer of the friction member transferred and adhered to insides of the plurality of recesses through sliding between the friction member and the metal member.

2. The friction engagement element according to claim 1, wherein the plurality of recesses include fine recesses formed by blasting.

3. The friction engagement element according to claim 1, wherein the plurality of recesses include grooves extending concentrically about a predetermined spot on the metal member.

4. The friction engagement element according to claim 1, wherein the plurality of recesses include a plurality of depressions formed at a predetermined interval.

5. A friction engagement element comprising:
a friction member comprising resin; and
a metal member having a sliding surface slidable on the friction member, wherein the friction member comprises:
an aged layer at an outermost layer of the friction member, the aged layer being a carbonized layer, and
a hardened layer in abutment with an inner side of the aged layer in a thickness direction of the friction member,
wherein the sliding surface of the metal member has a plurality of recesses,
wherein the plurality of recesses are configured to retain a transferred film of the aged layer of the friction member to be transferred and adhered to insides of the plurality of recesses by sliding when the friction member and the metal member slide relative to each other.

6. The friction engagement element according to claim 5, wherein a depth of each of the plurality of recesses is smaller than thickness of the aged layer of the friction member.

7. The friction engagement element according to claim 5, wherein the plurality of recesses include fine recesses formed by blasting.

8. The friction engagement element according to claim 7, wherein surface roughness Rz of the sliding surface including the fine recesses is between 3 µm and 10 µm inclusive.

9. The friction engagement element according to claim 5, wherein the plurality of recesses include grooves extending concentrically about a predetermined spot on the metal member.

10. The friction engagement element according to claim 9, wherein a depth of each of the grooves is between 6 µm and 16 µm inclusive.

11. The friction engagement element according to claim 5, wherein the plurality of recesses include a plurality of depressions formed at a predetermined interval.

12. The friction engagement element according to claim 11, wherein a depth of each of the depressions is between 3 µm and 9 µm inclusive and a width of each of the depressions is between 0.5 mm and 2.3 mm inclusive.

13. A dry clutch comprising the friction engagement element according to claim 1.

14. A friction engagement element comprising:
a friction member; and
a metal member having a sliding surface slidable on the friction member,
wherein the friction member comprises:
an aged layer made of a first friction material comprising resin at an outermost layer of the friction member,
a base material made of a second friction material comprising resin, and
a hardened layer between the base material and the aged layer and in abutment with an inner side of the aged layer in a thickness direction of the friction member, and
wherein the sliding surface of the metal member comprises:
a plurality of recesses, and
a transferred film of the aged layer of the friction material transferred and adhered to insides of the plurality of recesses through sliding between the friction member and the metal member.

15. The friction engagement element according to claim 14, wherein the first and second friction materials are made from a same material.

16. The friction engagement element according to claim 14, wherein the hardened layer has hardness that is higher than that of the base material and the aged layer.

17. The friction engagement element according to claim 14, wherein the hardened layer has a thickness less than that of the aged layer.

* * * * *